United States Patent [19]

Moorhead et al.

[11] Patent Number: 4,812,280
[45] Date of Patent: Mar. 14, 1989

[54] PROCESS FOR FABRICATION OF LARGE TITANIUM DIBORIDE CERAMIC BODIES

[75] Inventors: Arthur J. Moorhead; E. S. Bomar; Paul F. Becher, all of Knoxville, Tenn.

[73] Assignee: The United States of America as represented by the Department of Energy, Washington, D.C.

[21] Appl. No.: 853,118

[22] Filed: Apr. 17, 1986

[51] Int. Cl.$^4$ .............................................. C04B 35/58
[52] U.S. Cl. ...................... 264/332; 264/65; 501/98
[58] Field of Search .................. 264/332, 65; 501/98

[56] References Cited

U.S. PATENT DOCUMENTS 3,003,885 10/1961 Mandorf .............................. 264/332
4,268,314  5/1981 Montgomery ........................ 501/98
4,543,227  9/1985 Biddulph ............................. 264/332

OTHER PUBLICATIONS

Ferber, Effect of Microstructure on the Properties of TiB$_2$ Ceramics, Communications of the American Ceramic Society, Jan. 1983.
Federer, Fabrication and Characterization of Liquid Metal-Densified Tib$_2$ Ceramics, ORNL/TM-9572.
Becher, Effect of Residual Nickel Content on the Grain Size Dependent Mechanical Properties of TiB$_2$, Journal of Materials Science Letters 5, (1986) 195-197.

Primary Examiner—James Derrington
Attorney, Agent, or Firm—Katherine P. Lovingood; Stephen D. Hamel; Judson R. Hightower

[57] ABSTRACT

A process for manufacturing large, fully dense, high purity TiB$_2$ articles by pressing powders with a sintering aid at relatively low temperatures to reduce grain growth. The process requires stringent temperature and pressure applications in the hot-pressing step to ensure maximum removal of sintering aid and to avoid damage to the fabricated article or the die.

4 Claims, No Drawings

PROCESS FOR FABRICATION OF LARGE TITANIUM DIBORIDE CERAMIC BODIES

It was developed in research sponsored by Army Materials and Mechanics Research Center, Watertown, Mass. under Interagency Agreement MIPR 83-D071-05, under Union Carbide Corporation contract DE-AC05-840R21400 with the United States Department of Energy.

BACKGROUND OF THE INVENTION

This invention relates to a process for fabrication of large, fully dense, high strength titanium diboride ceramic bodies.

The ceramic titanium diboride (TiB2) has numerous exceptional properties including high hardness, high melting temperature, high electrical conductivity, and nonreactivity with various liquid metals that make it an attractive candidate for technological applications such as cutting tools, valve trim for erosive environments, cathodes in Hall-Heroult cells for aluminum smelting and for military armor. In general, the various shapes and sizes of such articles require a capability of manufacturing large, high density, polycrystalline ceramic structures. However densification of $TiB_2$ ceramics is complicated by two characteristics of this compound, its high melting point and its hexagonal structure. In the first instance, the high melting point of 2980° C. requires sintering temperatures on the order of 2000° C. for pressureless sintering to produce a ceramic having greater than 95% theoretical density; however, maintenance of such temperatures is costly and requires special equipment. Secondly, the hexagonal structure of $TiB_2$ results in marked thermal expansion anisotropy, i.e., expansion along the c-axis is considerably greater than that along the a-axis. The expansion difference is about 42% between 25° and 930° C., and this difference increases as the temperature exceeds 930° C. The expansion anisotropy produces considerable internal stress during specimen cooling that generates microcracking when the grain size is above a critical value. The microcracking occurs in the grains and at grain boundaries, with a resultant degradation of macroscopic mechanical properties.

At conventional sintering temperatures grain growth readily occurs, so that even if fine grained ceramic powder is used, a relatively large grained ceramic body is produced. To correct these problems a process of hot pressing in a vacuum at a temperature of 1800° C. was developed. However, such high temperatures and large vacuum systems are very costly, die lives are short, and even this lower temperature still promoted unacceptable grain growth.

Therefore, there is a need to provide a method for preparing $TiB_2$ articles in non-vacuum environments, at relatively low sintering temperatures and with minimum grain growth.

SUMMARY OF THE INVENTION

In view of the need it is an object of this invention to provide fully dense, high strength $TiB_2$ ceramic bodies in various shapes and sizes.

It is another object of this invention to provide a method of preparing $TiB_2$ ceramic bodies with minimum grain growth at relatively low sintering temperatures in non-vacuum environments.

Another object of this invention is to minimize strength-limiting microcracks and internal stresses in $TiB_2$ ceramic bodies upon cooling after sintering.

It is also an object of this invention to provide a process for fabrication of large, dense, strong $TiB_2$ ceramic bodies that have a minimum of retained sintering aid. Other objects and advantages of the invention will be apparent to those skilled in the art upon study of the specification an appended claims.

The invention is generally described as a process for forming large $TiB_2$ ceramic bodies by mixing $TiB_2$ powder with a sintering aid and in a nonoxidizing atmosphere gradually applying and properly maintaining sufficient pressure and temperature to achieve a fully dense, fine grained body. The sintering aid can be nickel or a mixture of nickel and aluminum. The preferred amount of sintering aid is from 1 to 15 wt. percent nickel of a mixture of nickel and aluminum having the nominal composition $Ni_3Al$, the preferred amount of the latter also being 1 to 15 wt. percent. Also, the invention is the above described process wherein 0.5 to 2.0 wt. percent carbon is added to the $TiB_2$ powders and sintering aid. In addition, the invention is a composition of matter of $TiB_2$ containing from 0.5 to 2.0 wt. percent of carbon.

DETAILED DESCRIPTION OF THE PREFERRED EMBODIMENT

Titanium diboride ceramics have several important characteristics that make them attractive candidate materials for such diverse applications as cutting tools, military armor and cathodes in Hall-Heroult cells for aluminum smelting. In general, such applications require fabrication of $TiB_2$ in various shapes and with material properties of high density, strength and toughness. Since hot pressing $TiB_2$ powder in a vacuum atmosphere at a temperature of 1800° C. has many disadvantages, a preferred approach is to use one or more sintering aids that form a liquid film on the $TiB_2$ grains during sintering. This liquid allows grain rearrangements into a more closely packed structure, and also dissolves some of the $TiB_2$ to promote rapid diffusive transport of both Ti and B throughout the microstructure. The liquid phase sintering process of this invention enables high density ceramic bodies to be produced at temperatures of 1450° to 1600° C. such that grain growth and the damaging microcracking, characteristic of conventionally fabricated $TiB_2$, are avoided. It utilizes a nonoxidizing gaseous atmosphere to greatly reduce fabrication costs relative to vacuum processing, and a carefully controlled time-temperature-pressure cycle to promote exudation of the sintering aid as densification progresses. Following this procedure precisely enhances removal of sintering aid and provides high purity $TiB_2$.

EXAMPLE I

In this process, compacts were uniaxially hot pressed with graphite dies and punches in a press equipped for either vacuum or inert atmosphere. The die cavity was about 2.7 cm ID and was lined with 0.25-mm thick Graphoil, a graphite product made by Union Carbide Corporation, but other suitable compositions capable of absorbing the extruded sintering aid and protecting the die can be substituted. The ends of the punches were also separated from the powder charge by Graphoil. The principal steps in the procedure were as follows:

1. Weigh powders of $TiB_2$ and a proportionate amount of Ni or other sintering aid to make 1 to 15 wt. percent of the total, typically 38 g.

2. Blend powders about 16 hours in an oblique blender using a blending container having a volume at least three times the volume of the powder.

3. Line die and punch faces with Graphoil and heat in air for about 16 hours at about 110° C. to reduce moisture content.

4. Load powder into cool die in an argon filled enclosure and prepress powder at approximately 0.5 MPa.

5. Install die in press and introduce the desired atmosphere at a pressure of 90 kPa.

6. Heat to about 1550° C. with an applied pressure of approximately 0.6 MPa which is 5 percent of the ultimate pressing pressure of 12 MPa.

7. Increase pressure continuously or in approximately 6 equal increments over a 30 minute period to 12 MPa.

8. Hold at temperature and pressure for 2 hours.

9. After 2 hours release pressure and cool to ambient temperature.

This procedure resulted in compacts measuring approximately 2.7 cm in diameter by 1.2 cm thick.

RESULTS

The hot pressing conditions and properties of compacts prepared in this investigation are shown in the following tables.

SUBSTITUTION OF GASEOUS ATMOSPHERE FOR VACUUM

The compacts of Table 1 revealed the effects of various gaseous atmospheres used during densification on properties of dense compacts. In these experiments the powder blend consisted of $TiB_2$ and 10 wt. percent Ni. Nitrogen atmosphere yielded poor results. At a pressing temperature of 1450° C., very poor sintering resulted in a density of only 3.08 g/cm$^3$ (the theoretical density of $TiB_2$ is 4.5 g/cm$^3$), and there was no evidence of Ni removal during pressure. Another compact hot pressed in $N_2$ at 1550° C. had a density of 5.22 g/cm$^3$, which indicated significant retention of Ni even though some exudation was observed. In addition, microstructural examination indicated that $N_2$ reacted with $TiB_2$, possible forming nitrides.

Subsequently, compacts hot pressed in an Ar atmosphere (samples 3, 4, 5, and 6 in Table 1) had desnities near the theoretical density of $TiB_2$. Microstructoral examination of sample 3 in a plane parallel to the pressing direction revealed a predominantly equiaxed grain structure with a second phase at grain boundaries. An average grain size of 13 μm was measured by the line intercept method.

Single samples were also hot pressed in Ar-4% $H_2$ and in vacuum. The conclusion deduced from these experiments was that Ar and Ar-4% $H_2$, but not $N_2$, are suitable substitutes for vacuum in hot pressing $TiB_2$. We would also expect that the inert gas helium would be acceptable.

TABLE 1

Hot pressing conditions and properties of $TiB_2$
Principal Variable: Atmosphere Composition, wt %: 90 $TiB_2$—10 Ni
Temperature[b]: 1550° C. Pressing Conditions: Hot pressing pressure was 12 MPa. Time at pressure and temperature was 2 hours except sample 6, which was 6 hours.

| Sample | Identity of $TiB_2$ powder[a] | Atmosphere | Density 9/cm$^3$ | Sonic Velocity Linear km/s | Sonic Velocity Transverse km/s | Shear modulus GPa | Young's modulus GPa |
|---|---|---|---|---|---|---|---|
| 1 | C030 | $N_2$ | 3.08 | | | | |
| 2 | C030 | $N_2$ | 5.22 | | | | |
| 3 | C030 | Ar | 4.598 | 11.09 | 7.363 | 249 | 552 |
| 4 | B190-1 | Ar | 4.459 | 10.82 | 7.233 | 233 | 510 |
| 5 | B190-1 | Ar | 4.473 | 10.89 | 7.371 | 243 | 524 |
| 6 | B190-1 | Ar | 4.482 | 10.89 | 7.404 | 246 | 526 |
| 12 | B190-1 | Ar—4% $H_2$ | 4.434 | 10.504 | 7.129 | 225 | 484 |
| 15 | B190-2 | Vacuum | 4.468 | 10.767 | 7.318 | 239 | 512 |

| Sample | Lame's Constant GPa | Poisson's ratio | Fracture Strength MPa | Hardness kg/mm$^2$ | Fracture Toughness, MPa · m$^{\frac{1}{2}}$ A[c] | Fracture Toughness, MPa · m$^{\frac{1}{2}}$ B[d] | Nominal grain size μm |
|---|---|---|---|---|---|---|---|
| 1 | | | | | | | |
| 2 | | | | | | | |
| 3 | 67.3 | 0.106 | 400 ± 25 | 2701 ± 33 | 5.1 ± 0.4 | 4.4 ± 0.3 | 13 |
| 4 | 55.4 | 0.096 | 470 ± 80 | 2277 ± 95 | 6.0 ± 0.6 | 8.5 ± 0.9 | 6 |
| 5 | 44.5 | 0.077 | | 2207 ± 16 | 6.7 ± 1.1 | | 6 |
| 6 | 40.0 | 0.070 | 425 ± 25 | 2284 ± 625 | 6.4 ± 1.5 | 8.2 ± 0.8 | 8 |
| 12 | 38.5 | 0.073 | | 2333 ± 325 | 7.5 ± 1.1 | | 6 |
| 15 | 39.4 | 0.071 | | 2300 ± 98 | 5.9 ± 0.9 | | 6 |

[a]Source - C030, B190-1, B190-2: Kawecki Berylco Industries, Inc., Boyertown, Penn.
[b]Sample 1 was at 1450° C.
[c]Indentation method.
[d]Double cantilever beam method.

EFFECT OF Ni CONTENT

The effect of initial Ni content of the blended $TiB_2$ and Ni powders on compact properties was investigated. The compacts of Table 2, which were arranged in order of increasing initial Ni content, do not show a strong dependence within the range 1 to 10 wt. percent Ni. Sample 9, which had only 1 wt. percent Ni in the starting powder, had the lowest density in the group, while sample 32, which had 3 wt. percent Ni, had the highest density. the densities of samples 8, 9, 10, 11, and 13, each prepared from the same powder, exhibit a small increase with increasing Ni content.

Microstructures of compacts prepared from powder mixtures containing 1, 3, 5 and 10 wt. percent Ni were very similar in terms of size and distribution of the grain boundary phase. Isolated high concentrations of Ni and O were found in the grain boundary phase by electron microprobe analysis. Similar distributions of Ni and O were found in the microstructure in regions near the surface.

The weight loss during hot pressing exceeds the amount of Ni in the initial powder mixture. The difference between predicted and actual weight losses indicates handling losses and/or dissolution of $TiB_2$ and ejection with the Ni. Loss of some $TiB_2$ probably occurs, and a small amount of Ni was retained in the grain boundary phase. Most of the Ni exudes from the compacts during hot pressing of powder mixtures initially containing 1 to 10 wt. percent Ni.

substantially larger average particle sizes than the other powders. These results indicate that the average particle size of the $TiB_2$ powder should be substantially less than 10 micrometers to ensure highly dense, crack-free compacts.

TABLE 3

Hot pressing conditions and properties of $TiB_2$
Principal Variable: $TiB_2$ Powder Composition wt %: 90 $TiB_2$—10 Ni
Temperature: 1550° C. Atmosphere: Ar Pressing Conditions: Hot pressing pressure was 12 MPa. Time at pressure and temperature was 2 hours.

| Sample | Identity of $TiB_2$ powder[a] | Density g/cm$^3$ | Sonic velocity Linear km/s | Sonic velocity Transverse km/s | Shear modulus GPa | Young's modulus GPa | Lame's Constant GPa | Poisson's ratio | Hardness kg/mm$^2$ | Fracture Toughness, MPa · m$^{\frac{1}{2}}$ A[b] | Nominal grain size μm |
|---|---|---|---|---|---|---|---|---|---|---|---|
| 24 | B190-2 | 4.462 | 10.780 | 7.310 | 238 | 512 | 41.7 | 0.074 | 2610 ± 71 | 5.1 ± 0.2 | 6 |
| 25 | B190-2 | 4.458 | 10.704 | 7.238 | 234 | 504 | 43.7 | 0.079 | | | |
| 38 | Starck | 4.460 | 10.589 | 7.071 | 223 | 490 | 54.1 | 0.098 | 2100 ± 20 | 6.1 ± 0.4 | 6 |
| 39 | UCC | 4.525 | 9.793 | 6.738 | 208 | 433 | 17.6 | 0.039 | 1713 ± 20 | 5.6 ± 0.3 | 7 |
| 41 | UCC | 4.529 | | | | | | | | | |
| 40 | Cotronics | 4.410 | 10.174 | 6.830 | 206 | 448 | 45.0 | 0.089 | 2376 ± 30 | | 5 |
| 42 | C310 | 4.417 | 10.455 | 7.053 | 220 | 478 | 43.4 | 0.082 | | | |
| 43 | ART | 4.243 | 10.420 | 6.889 | 201 | 448 | 57.9 | 0.112 | | | |

[a]Sample - B190-2, C310: Kawecki Berylco Industries, Inc., Boyertown, Penn.
Starck: Hermann C. Starck, West Germany
UCC: Union Carbide Corporation
Cotronics: Cotronics Corporation, Brooklyn, N.Y.
ART: Advanced Refractories Technologies, Inc., Buffalo, N.Y.
[b]Indentation method.

TABLE 2

Hot pressing conditions and properties of $TiB_2$
Principal Variable: Ni Content Temperature: 1500° C. Atmosphere: Ar
Pressing Conditions: Hot pressing pressure was 12 MPa except sample 10 pressed at 24 MPa. Time at pressure was 2 hours.

| Sample | Identity of $TiB_2$ powder[a] | Initial composition of blended powders, wt % $TiB_2$ | Initial composition of blended powders, wt % Ni | Density | Sonic Velocity Linear | Sonic Velocity Transverse | Shear modulus GPa | Young's modulus GPa |
|---|---|---|---|---|---|---|---|---|
| 9 | B190-1 | 99 | 1 | 4.407 | 10.56 | 7.129 | 224 | 483 |
| 32 | B190-2 | 97 | 3 | 4.472 | 10.450 | 7.067 | 223 | 482 |
| 8 | B190-1 | 95 | 5 | 4.413 | 10.49 | 7.102 | 223 | 480 |
| 10 | B190-1 | 90 | 10 | 4.421 | 10.51 | 7.144 | 224 | 478 |
| 11 | B190-1 | 90 | 10 | 4.429 | 10.417 | 7.097 | 223 | 476 |
| 13 | B190-1 | 90 | 10 | 4.428 | 10.385 | 7.054 | 220 | 472 |

| Sample | Lame's Constant GPa | Poisson's ratio | Fracture Strength MPa | Hardness kg/mm$^2$ | Fracture Toughness, MPa · m$^{\frac{1}{2}}$ A[b] | Fracture Toughness, MPa · m$^{\frac{1}{2}}$ B[c] | Nominal grain size μm |
|---|---|---|---|---|---|---|---|
| 9 | 43.8 | 0.082 | 393 ± 25 | 1883 ± 17 | 5.7 ± 0.2 | 6.8 ± 0.4 | 7 |
| 32 | 41.7 | 0.079 | | 3175 ± 330 | 5.8 ± 1.0 | | 6 |
| 8 | 40.5 | 0.077 | 480 ± 15 | 2138 ± 3 | 5.3 ± 0.1 | 6.7 ± 0.1 | 8 |
| 10 | 36.4 | 0.070 | 525 ± 45 | 2120 ± 18 | 4.9 ± 0.1 | 7.2 | 8 |
| 11 | 34.5 | 0.067 | | 2152 ± 272 | 6.0 ± 0.5 | | 6 |
| 13 | 36.9 | 0.072 | | | 3.4 ± 0.7 | | 7 |

[a]Source - B190-1, B190-2: Kawecki Berylco Industries, Inc., Boyertown, Penn.
[b]Identation method.
[c]Double cantilever beam method.

EFFECT OF $TiB_2$ POWDER

The compacts of Table 3 were hot pressed under identical conditions with different $TiB_2$ powders. All powders yielded compacts having densities greater than 98 percent theoretical density except the ART powder. Both compacts pressed with UCC powder, however, contained cracks. The UCC and ART powders had

EFFECT OF TEMPERATURE

A group of four samples is arranged in Table 4 to show the effect of hot pressing temperature on properties particularly density in relation to temperature. Nickel (m.p. 1453° C.) is either nearly or actually molten at each pressing temperature in the range 1450° to 1600° C. Apparently Ni aids densification more or less equally at these temperatures. The temperature of 1550° C. used primarily in this work was considered to be sufficient to produce compacts of high density while still retaining the advantage of minimizing detrimental grain growth. There are also obvious economic advantages associated with lower processing temperatures.

TABLE 4

Hot pressing conditions and properties of TiB$_2$
Principal Variable: Temperature Composition wt %: 90 TiB$_2$—10 Ni Atmosphere: Ar Pressing Conditions:
Hot pressing pressure was 12 MPa. Time at pressure and temperature was 2 hours.

| Sample | Identity of TiB$_2$ powder[a] | Temperature (C.°) | Density 9/cm$^3$ | Sonic Velocity Linear km/s | Sonic Velocity Transverse km/s | Shear Modulus GPa |
|---|---|---|---|---|---|---|
| 7  | B190-1 | 1450 | 4.405 | 10.43   | 7.026 | 218 |
| 28 | B190-2 | 1500 | 4.407 | 10.453  | 7.017 | 217 |
| 33 | C310   | 1550 | 4.415 | 10.441  | 7.035 | 219 |
| 29 | B190-2 | 1600 | 4.450 | 10.470  | 7.172 | 229 |

| Sample | Young's modulus GPa | Lame's Constant GPa | Poisson's ratio | Hardness kg/mm$^2$ | Fracture Toughness, MPa·m$^{\frac{1}{2}}$ A[b] | Fracture Toughness, MPa·m$^{\frac{1}{2}}$ B[c] | Nominal grain size μm |
|---|---|---|---|---|---|---|---|
| 7  | 474 | 44.5 | 0.085  | 2551 ± 26  | 5.9 ± 0.4 | 2.8 ± 0 | 6 |
| 28 | 473 | 47.6 | 0.0899 | 2314 ± 65  | 5.7 ± 0.5 |         | 6 |
| 33 | 474 | 44.3 | 0.0843 | 3246 ± 304 | 5.7 ± 0.8 |         | 5 |
| 29 | 484 | 30.0 | 0.0580 | 2512 ± 166 | 5.4 ± 0.5 |         | 6 |

[a]Source - Kawecki Berylco Industries, Inc., Boyertown, Penn.
[b]Indentation method.
[c]Double cantilever beam method.

EFFECT OF CARBON CONTENT

Based on observations of modified microstructure in the portion of experimental TiB$_2$ compacts in contact with the graphite die liners, the deliverate addition of carbon was investigated to determine if (1) the microstructure as modified throughout the compact by addition of carbon and (2) if properties of the compacts were significantly affected. Carbon additions of 0.5 to 2 wt. percent were made as elemental carbon or phenolic resin. Various mixing methods were used including simple dry blending, slurry mixing, ball milling, coating with resin, etc. Resin coating followed by thermal decomposition of the resin to C was less effective because of the high volatility (and resultant loss) of the resin. Ball milling of elementary carbon with the powder was the preferred technique for producing a homogeneous distribution of carbon.

We found that the amount of grain boundary phase decreased with increasing C content and its shape changed from angular to rounded. Both changes would be expected to be beneficial to mechanical properties.

TABLE 5

Hot pressing conditions and properties of TiB$_2$
Principal Variable: C Content Temperature: 1550° C. Atmosphere: Ar
Pressing Conditions: Hot pressing pressure was 12 MPa. Time at
pressure and temperature was 2 hours.

| Sample | Identity of TiB$_2$ powder[a] | Initial composition of blended powders, wt % TiB$_2$ | Ni | C | Density 9/cm$^3$ | Sonic velocity Linear m/s | Sonic velocity Transverse km/s | Shear modulus GPa |
|---|---|---|---|---|---|---|---|---|
| 16 | B190-2 | 89.5 | 10 | 0.5 | 4.492 | 10.978 | 7.417 | 247 |
| 17 | B190-2 | 89.5 | 10 | 0.5 | 4.481 | 11.090 | 7.395 | 245 |
| 18 | B190-2 | 89.5 | 10 | 0.5 | 4.492 | 10.963 | 7.427 | 248 |
| 19 | B190-2 | 89.5 | 10 | 0.5 | 4.395 | 10.435 | 7.071 | 220 |
| 20 | B190-2 | 89   | 10 | 1.0 | 4.505 | 11.118 | 7.524 | 255 |
| 21 | B190-2 | 89   | 10 | 1.0 | 4.500 | 11.109 | 7.494 | 253 |
| 22 | B190-2 | 89   | 10 | 1.0 | 4.477 | 11.061 | 7.403 | 245 |
| 23 | B190-2 | 89   | 10 | 1.0 | 4.382 |        |       |     |
| 26 | B190-2 | 89   | 10 | 1.0 | 4.497 | 11.033 | 7.540 | 256 |
| 27 | B190-2 | 89   | 10 | 1.0 | 4.490 | 11.089 | 7.450 | 249 |
| 30 | B190-2 | 94   | 5  | 1.0 | 4.490 | 11.007 | 7.492 | 252 |
| 31 | B190-2 | 96   | 3  | 1.0 | 4.487 | 11.113 | 7.530 | 254 |
| 14 | B190-2 | 88   | 10 | 2.0 | 4.556 | 9.920  | 6.821 | 213 |

| Sample | Young's modulus | Lame's Constant GPa | Poisson's ratio | Hardness kg/mm$^2$ | Fracture Toughness, MPa·m$^{\frac{1}{2}}$ A[b] | Fracture Toughness, MPa·m$^{\frac{1}{2}}$ B[c] | Nominal grain size μm |
|---|---|---|---|---|---|---|---|
| 16 | 534 | 47.1 | 0.081  | 2285 ± 184 | 5.9 ± 0.3 | 3.2 ± 0.8 | 8 |
| 17 | 539 | 61.0 | 0.0997 | 2216 ± 104 | 5.8 ± 0.8 |           | 6 |
| 18 | 533 | 44.3 | 0.0759 | 2148 ± 87  | 5.3 ± 0.7 |           | 7 |
| 19 | 473 | 39.1 | 0.0755 | 2027 ± 160 | 5.8 ± 1.2 |           | 8 |
| 20 | 550 | 46.8 | 0.0775 | 2223 ± 57  | 4.5 ± 0.5 | 3.5 ± 0.2 | 8 |
| 21 | 547 | 49.9 | 0.0825 | 2245 ± 53  | 4.4 ± 0.3 | 3.6 ± 1.0 | 6 |
| 22 | 537 | 57.0 | 0.0943 | 2206 ± 121 | 5.2 ± 0.4 |           | 6 |
| 23 |     |      |        |            |           |           |   |
| 26 | 543 | 36.1 | 0.0618 | 2408 ± 142 | 6.0 ± 0.2 |           | 8 |
| 27 | 543 | 53.7 | 0.0865 | 2818 ± 17  | 5.7 ± 0.7 |           | 10 |
| 30 | 539 | 39.9 | 0.0684 | 2402 ± 36  | 5.8 ± 0.8 |           | 6 |
| 31 | 547 | 45.3 | 0.0756 | 2420 ± 81  | 6.0 ± 0.1 |           | 5 |

TABLE 5-continued

Hot pressing conditions and properties of $TiB_2$
Principal Variable: C Content Temperature: 1550° C. Atmosphere: Ar
Pressing Conditions: Hot pressing pressure was 12 MPa. Time at
pressure and temperature was 2 hours.

| 14 | 448 | 24.5 | 0.052 | 1924 ± 154 | 5.2 ± 0.5 | 10 |

[a]Source - Kawecki Berylco Industries, Inc., Boyertown, Penn.
[b]Indentation method.
[c]Double cantilever beam method.

OTHER SINTERING AIDS

The samples of Table 6 were blended and pressed with the compounds CoB, $TaB_2$, $W_2B_5$ and $Ni_3Al$ as densification aids rather than Ni. Other investigators determined that $TiB_2$ containing additions of CoB, or CoB plus $TaB_2$ or $W_2B_5$, minimized grain growth and improved mechanical properties of $TiB_2$ ceramics. Our results show that the compact densified with $Ni_3Al$ had slightly larger grains but was harder and about as tough as the ceramics densified with CoB or CoB plus $TaB_2$ or $W_2B_5$. the advantage of the $Ni_3Al$ as densification aid over CoB, $TaB_2$ or $W_2B_5$ is in cost, and based on the hardness values we would predict a stronger ceramic.

TABLE 6

Hot pressure conditions and properties of $TiB_2$
Principal Variable: Hot Pressing Aid Temperature: 1550° C. Atmosphere: Ar Pressing Conditions: Hot pressing
pressure was 12 MPa. Time at pressure and temperature was 2 hours.

| Sample | Identity of $TiB_2$ powder[a] | Initial composition of blended powders, wt % | | | Density 9/cm³ | Sonic velocity | |
|---|---|---|---|---|---|---|---|
| | | $TiB_2$ | Ni | C[b] | | km/s | km/s |
| 34 | B190-2 | 99 | 1 CoB | | 4.396 | 10.557 | 7.137 |
| 35 | B190-2 | 94 | 1 CoB | 5 $TaB_2$ | 4.536 | 10.522 | 6.997 |
| 36 | B190-2 | 94 | 1 CoB | 5 $W_2B_5$ | 4.455 | 10.579 | 6.693 |
| 37 | B190-2 | 91.8 | 8.2 $Ni_3Al$ | | 4.438 | 10.948 | 7.302 |

| Sample | Shear modulus GPa | Young's modulus GPa | Lame's Constant GPa | Poisson's ratio | Hardness kg/mm² | Nominal grain size μm |
|---|---|---|---|---|---|---|
| 34 | 224 | 483 | 42.1 | 0.079 | | 6 |
| 35 | 222 | 490 | 58.0 | 0.104 | 2100 ± 71 | 4 |
| 36 | 200 | 466 | 99.5 | 0.166 | 2233 ± 20 | 4 |
| 37 | 237 | 520 | 58.7 | 0.099 | 2580 ± 92 | 10 |

[a]Source - B190-2: Kawecki Berylco Industries, Inc., Boyertown, Penn.
[b]Except as noted.

EXAMPLE II

Scale-up of Fabrication Procedure

Having demonstrated that a gaseous atmosphere (Ar or Ar-$H_2$) could be substituted for vacuum during hot pressing of $TiB_2$ with Ni (or $Ni_3Al$) as a densification aid, the next goal was to fabricate nominal 15 cm×15 cm×2.5 and 25×25×5 cm $TiB_2$ ceramic tiles. Six of the smaller and three of the larger tiles were produced using an argon atmosphere, with duplicate runs made under vacuum. Essentially the same procedure was used as described above except that a pressure of 24 MPa was used (instead of 12 MPa) to ensure high density and low residual Ni content in these large bodies. We found that if this process were rigorously followed that fine-grained, essentially fully dense $TiB_2$ ceramics were produced, and that the material s were the same for either vacuum or inert-gas processing. The ceramic bodies also had excellent strength (>400 MPa) and fracture toughness (>6 MPa·m½). The procedure is specific and slight deviations can result in an unacceptable product or die damage.

For example, increasing the ram pressure over a shorter period of time than the 30 minutes ramp time as specified in this processing procedure caused the failure of very large filament-wound graphite dies apparently as the result of hydraulic forces exerted by the liquid nickel on the side wall of the die cavity. when the ram pressure is slowly applied, the pressure on the side-wall is minimized and the compacting body behaves much like a densifying ceramic with no liquid present.

In another instance two 25.4×25.4×5 cm tiles were densified by hot-pressing in vacuum. In both cases the conditions were identical except for one case the time-temperature-load procedure was deviated, resulting in a product with 7.1 wt. percent retained nickel and a fracture toughness of 5.8 MPa·m½. In the second case the procedure was followed as previously specified and a ceramic body was produced having only 1.9 wt. percent retained nickel and corresponding improved toughness of 6.7 MPa·m½.

When five 15×15×2.5 cm tiles were densified by hot-pressing following the process of this invention they had an average retained nickel content of only 1.1 wt. percent indicating the effectiveness of the specific procedures.

These examples demonstrate that the hot pressing process in a nonoxidizing environment under pressure at lower temperatures using a sintering aid results in a large $TiB_2$ article with small grain size, free of cracks and with good strength. The economy of this process makes it attractive for industrial fabrication of large $TiB_2$ ceramic bodies.

We claim:

1. A process for forming $TiB_2$ ceramic bodies having a flexural strength greater than 400 MPa and a density greater than 99% of theoretical density comprising:

forming a mixture comprising $TiB_2$ powder and a sintering aid selected from the group nickel, nickel aluminide and mixtures thereof;

lining a die with a no dense nonreactive material capable of absorbing said sintering aid and of protecting said die from interacting with said TiB$_2$ powder;

in a nonoxidizing atmosphere placing said mixture in said die;

in a nonoxidizing atmosphere applying pressure of about 5 percent of final pressure and raising temperature to a level sufficiently low to avoid grain growth an said TiB$_2$ but sufficiently high to liquify said sintering aid under final pressing pressure said temperature being about 1550 C.;

increasing pressure at a sufficiently slow and steady rate so that sintering aid liquefaction, material transfer, temperature dispersing and compaction occur at a suitable rate to maximize strength, toughness and density of a resulting TiB$_2$ ceramic and to cause said sintering aid to migrate to the surface of said ceramic body said rate being from 5 percent of final pressure pressure over about 30 minutes, the final pressure being from 12 to 24 MPa;

in a nonoxidizing atmosphere, holding said final temperature and said final pressure stable for not less than two hours;

releasing said pressure and lowering said temperature to ambient conditions.

2. The process of claim 1 wherein said non dense, nonreactive material is graphite.

3. The process of claim 2 wherein said sintering aid is 1 to 15 wt. percent of said mixture.

4. The process of claim 3 wherein said mixture contains 0.5 to 2.0 wt. percent carbon

* * * * *